(12) United States Patent
Shibukawa et al.

(10) Patent No.: US 8,100,806 B2
(45) Date of Patent: Jan. 24, 2012

(54) TRAVEL ASSEMBLY

(75) Inventors: Takeshi Shibukawa, Tsuchiura (JP); Hayato Masuda, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 296 days.

(21) Appl. No.: 12/392,413

(22) Filed: Feb. 25, 2009

(65) Prior Publication Data

US 2009/0215569 A1 Aug. 27, 2009

(30) Foreign Application Priority Data

Feb. 26, 2008 (JP) ................................ 2008-044686

(51) Int. Cl.
*F16H 57/04* (2010.01)

(52) U.S. Cl. .......... 475/159; 475/160; 180/65.6; 74/468

(58) Field of Classification Search ................ 180/65.6; 475/149, 150, 159, 160; 184/6.12; 74/467, 74/468

See application file for complete search history.

(56) References Cited

U.S. PATENT DOCUMENTS

| | | | | |
|---|---|---|---|---|
| 4,261,219 A * | 4/1981 | Suzuki et al. | ............... | 74/467 |
| 4,899,622 A * | 2/1990 | Kobayashi | ............... | 475/160 |
| 5,382,854 A * | 1/1995 | Kawamoto et al. | ......... | 310/67 R |
| 6,942,049 B2 * | 9/2005 | Shimizu | ................ | 180/65.6 |
| 7,396,308 B2 * | 7/2008 | Tabata et al. | ............... | 475/159 |
| 7,641,010 B2 * | 1/2010 | Mizutani et al. | ............ | 180/65.51 |
| 2003/0015360 A1 * | 1/2003 | Villeneuve | ................ | 180/65.6 |
| 2004/0065169 A1 | 4/2004 | Ciszak et al. | | |
| 2006/0223665 A1 * | 10/2006 | Matsushita et al. | .......... | 475/159 |

OTHER PUBLICATIONS

The American Heritage Dictionary, 1982, Houghton Miffin Company, vol. 2.*

* cited by examiner

*Primary Examiner* — David D Le
*Assistant Examiner* — Huan Le
(74) *Attorney, Agent, or Firm* — Crowell & Moring LLP

(57) ABSTRACT

A travel assembly, for example, suited for arrangement on a vehicle such as a mining dump truck, is provided with a travel motor, a planetary speed reduction mechanism for transmitting rotation of the travel motor at a lower rotational speed, a spindle forming an axle, and a wheel supported on the spindle via a tapered roller bearing and rotatable by the planetary speed reduction mechanism. The planetary speed reduction mechanism includes a sun gear rotatable by rotation of a shaft of the travel motor, planet gears for rotating the wheel in response to rotation of the sun gear, and a carrier for holding the planet gears. The travel assembly is provided with a spline connection connecting the spindle and the carrier with each other and an oil passage for guiding internal lube oil of the planetary speed reduction mechanism to the spline connection.

2 Claims, 5 Drawing Sheets

TRAVEL ASSEMBLY

CROSS-REFERENCE TO RELATED APPLICATION

This application claims the priority of Japanese Patent Application 2008-44686 filed Feb. 26, 2008, which is incorporated herein by reference.

BACKGROUND OF THE INVENTION

1. Field of the Invention

This invention relates to a travel assembly suited for arrangement on a vehicle such as a mining dump truck and having a travel motor and a planetary speed reduction mechanism for transmitting rotation of the travel motor at a lower rotational speed.

2. Description of the Related Art

As a conventional technology of this sort, there is one disclosed in Ciszak et al. U.S. Patent Application Publication No. 2004/0065169 A1. This conventional technology is provided with a travel motor, a planetary speed reduction mechanism for transmitting rotation of the travel motor at a lower rotational speed, a spindle forming an axle, a hub arranged on an outer side of the spindle and splined to the spindle, and a wheel supported on the hub via tapered roller bearings and rotatable by the planetary speed reduction system. The planetary speed reduction mechanism is provided with a sun gear rotatable by a shaft of the travel motor, planet gears for rotating the wheel in response to rotation of the sun gear, stepped pins forming rotary shafts for the planetary gears, a carrier supporting the stepped pins thereon and splined to the above-mentioned hub, and bolts fixedly securing the above-mentioned stepped pin on the carrier. The conventional travel assembly equipped with such a construction as described above is used for the rotational drive or the like of a tire of a mining dump truck.

With respect to the above-mentioned conventional technology, there is an outstanding desire for a construction that eliminates the hub splined to both the spindle and the planetary speed reduction mechanism with a view to increasing the strength of the spindle and cutting down the manufacturing cost, etc. To adopt such a non-hub construction as described above, it may be contemplated to directly spline the spindle and the carrier to each other. When constructed so, however, reaction force to rotation of a rotating member such as the wheel acts on a spline connection between the spindle and the carrier which are in mutually-micromovable relation. Namely, the spline connection repeats a micromovement while receiving reaction force, leading to a potential problem that the spline connection may undergo wearing and its durability may deteriorate. The issue is, therefore, to assure lubrication to the spline connection.

SUMMARY OF THE INVENTION

With the above-mentioned circumstances of the conventional art in view, the present invention has as an object thereof the provision of a travel assembly capable of realizing spline connection between a spindle and a planetary speed reduction mechanism.

To achieve the above-described object, the present invention provides a travel assembly provided with a travel motor, a planetary speed reduction mechanism for transmitting rotation of the travel motor at a lower rotational speed, a spindle forming an axle, and a wheel supported on the spindle via a tapered roller bearing and rotatable by the planetary speed reduction mechanism, said planetary speed reduction mechanism comprising a sun gear rotatable by rotation of a shaft of the travel motor, planet gears for rotating the wheel in response to rotation of the sun gear, and a carrier for holding the planet gears, wherein the travel assembly is provided with a spline connection connecting the spindle and the carrier with each other and an oil passage for guiding internal lube oil of the planetary speed reduction mechanism to the spline connection.

The present invention constructed as described above can rotate the wheel while transmitting reaction force to rotation of the wheel to the spline connection between the carrier and the spindle via the carrier without needing the arrangement of a hub to be splined to both the spindle and the carrier. It is, therefore, possible to make use of the space, which has heretofore been needed for the installation of the hub, as a space for permitting an enlargement of the diametrical dimension of the spindle. As a consequence, the diametrical dimension of the spindle can be enlarged to increase its strength, and further, the elimination of the hub can reduce the number of components. In addition, the internal lube oil of the planetary speed reduction mechanism can be guided to the spline connection between the spindle and the carrier via the oil passage so that good lubrication can be assured for the spline connection. It is, accordingly, possible to prevent the wearing of the spline connection, which would otherwise occur by reaction force to be applied to the spline connection via the carrier and mutual micromovements between the spindle and the carrier.

Preferably, the travel assembly according to the present invention may be further provided with a retainer, which is in contact with an end face of the spindle and the carrier and presses the tapered roller bearing, and the retainer may be provided with the oil passage. The present invention constructed as mentioned immediately above can prevent by the retainer leakage of the internal lube oil of the planetary speed reduction mechanism in a large amount to the side of the travel motor, and in combination with the oil passage arranged on the retainer, can reduce an increase in the number of components to be required for the supply of oil to the spline connection for its lubrication.

In the travel assembly according to the present invention, the oil passage may preferably comprise a groove. The present invention constructed as mentioned immediately above makes it possible to readily form the oil passage on the retainer.

In the travel assembly according to the present invention, the retainer may preferably be provided with a guide portion for guiding the internal lube oil of the planetary speed reduction mechanism to the oil passage. The present invention constructed as mentioned immediately above makes it possible to smoothly and surely guide the internal lube oil of the planetary speed reduction mechanism to the oil passage via the guide portion.

In the travel assembly according to the present invention, the guide portion may preferably comprise a flange portion having an inner diameter set smaller than a bore inner diameter of the tapered roller bearing and provided with an inclined surface for guiding the lube oil to the oil passage. According to the present invention constructed as mentioned immediately above, the flange portion is formed as a portion of the retainer so that no increase takes place in the number of components. In addition, the guide portion is in the form of the flange portion provided with the inclined surface, and therefore, the guide portion is simple in construction and can be easily arranged on the retainer.

Owing to the arrangement of the spline connection to connect the spindle and the carrier of the planetary speed reduction mechanism and the oil passage to guide the internal lube oil of the planetary speed reduction mechanism to the spline connection, the present invention can rotate the wheel while transmitting reaction force, which is produced to rotation of a rotating member such as the wheel, to the spline connection between the carrier and the spindle via the carrier without needing a hub to be splined to both the spindle and the carrier as in the conventional art. It is, therefore, possible to increase the diametrical dimension of the spline to provide the spindle with greater strength and to realize a more stable structure. By the internal lube oil of the planetary speed reduction mechanism as guided via the oil passage, good lubrication is assured for the spline connection between the spindle and the carrier, thereby making it possible to reduce the wearing of the spline connection and to assure excellent durability.

DETAILED DESCRIPTION OF PREFERRED EMBODIMENTS

The present invention will hereinafter be described based on the accompanying drawings of best modes for practicing the travel assembly according to the present invention.

Figure 1:
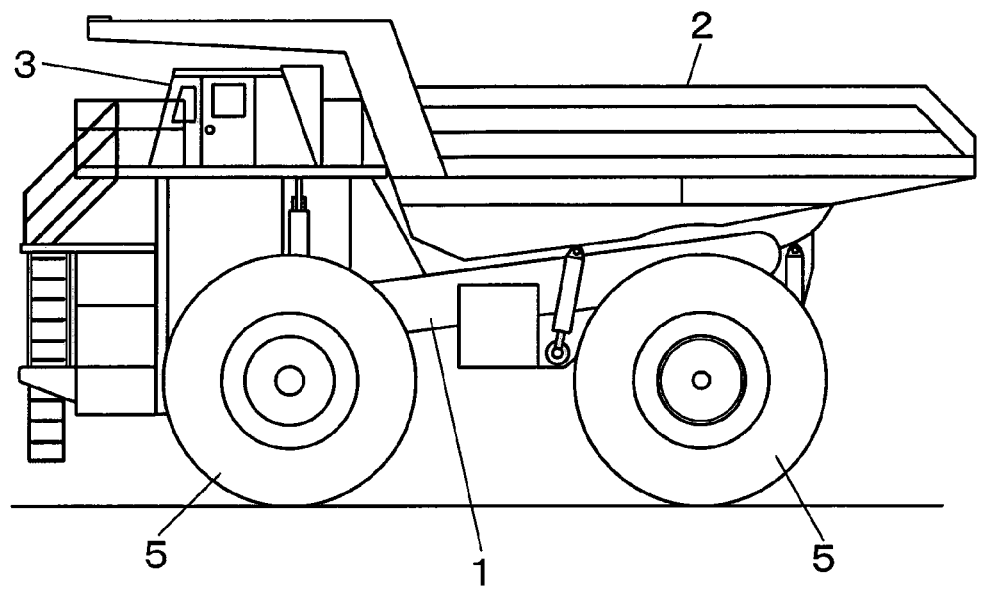
FIG. 1 is a side view of a mining dump truck illustrated as one example of vehicles on which the travel assembly according to the present invention can be arranged.
Figure 2:
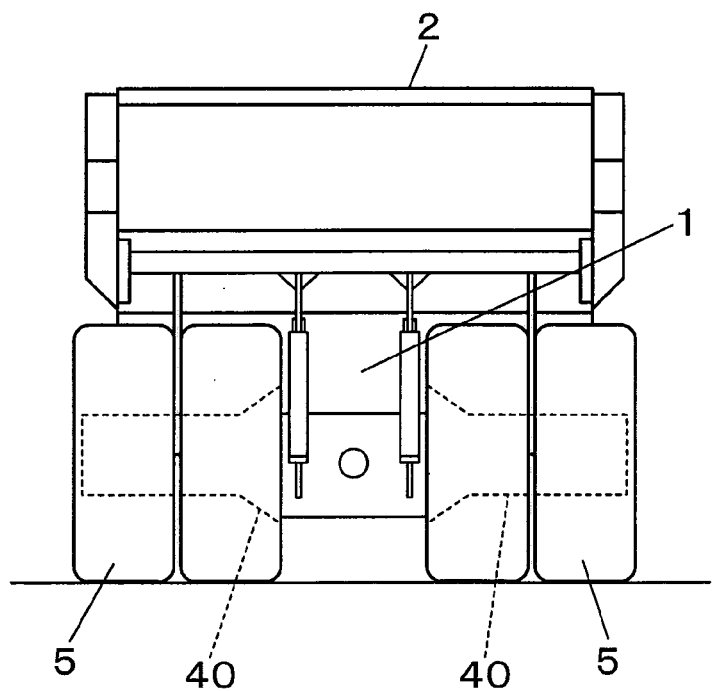
FIG. 2 is a rear view of the dump truck depicted in FIG. 1.

Travel assemblies to which the present invention is applied are arranged on a vehicle, for example, a mining dump truck shown in FIGS. 1 and 2. This mining dump truck is provided with a chassis 1, a load carrying platform 2 arranged for tilting movement on the chassis 1, a cab 3 arranged on a front part of the chassis 1, and plural tires 5. As depicted in FIG. 2, each combination of two tires 5 are connected to a corresponding travel assembly 40 such that these tires 5 can be rotationally driven by rotational force applied by the corresponding travel assembly 40.

A travel assembly 4A according to one embodiment of the present invention will next be described in detail with reference to FIGS. 3, 4 and 5.

Figure 3:
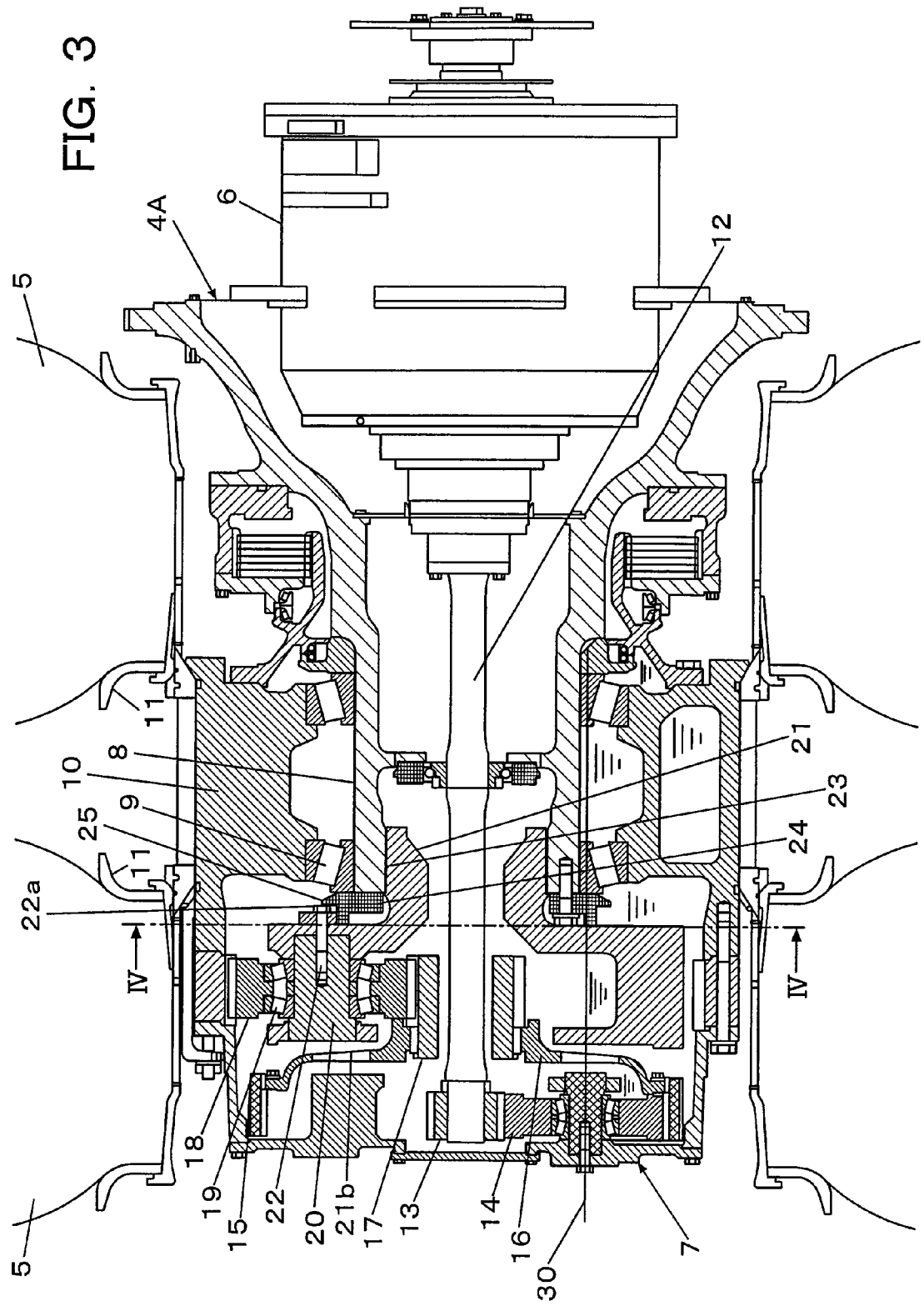
FIG. 3 is a fragmentary cross-sectional view of a travel assembly according to one embodiment of the present invention.

As illustrated in FIG. 3, the travel assembly 4A according to the one embodiment of the present invention is provided with a travel motor 6, a planetary speed reduction mechanism 7 for transmitting rotation of the travel motor 6 at a lower rotational speed, a spindle 8 forming an axle, and a wheel 10 rotatably supported on the spindle 8 via tapered roller bearings 9 for rotation by the planetary speed reduction mechanism 7. Tires 5 are integrally mounted on rims 11, and the rims 11 and the above-mentioned wheel 10 are connected together.

The planetary speed reduction mechanism 7 is connected to a shaft 12 of the travel motor 6, and includes a first-stage sun gear 13 rotatable in response to rotation of the shaft 12, plural planet gears 14 arranged in meshing engagement with the sun gear 13, a ring gear 15 provided at an inner periphery thereof with teeth which are in meshing engagement with the planet gears 14, and a gear coupling 16 rotatable in response to rotation of the respective planet gears 14. Also included are a second-stage sun gear 17 rotatable in response to rotation of the gear coupling 16, and plural planet gears 18 arranged in meshing engagement with the sun gear 17 to rotate the wheel 10 in response to rotation of the sun gear 17. Further included are plural stepped pins 20 forming rotary shafts for the respective planet gears 18, tapered roller bearings 19 interposed between the respective stepped pins 20 and their corresponding planet gears 18, a carrier 21 holding the respective stepped pins 20 thereon, and bolts 22 fixedly securing the respective stepped pins 20 on the carrier 21. Heads 22a of the respective bolts 22 are arranged opposite the tapered roller bearings 9 that rotatably support the above-mentioned wheel 10 thereon.

A spline connection 23 is also arranged to connect the spindle 8 and the carrier 21 of the planetary speed reduction mechanism 7. As depicted in FIG. 5, splines 21a on the carrier 21 are arranged such that they slightly protrude toward the planetary speed reduction mechanism 7 beyond splines 8a on the spindle 8.

Also provided is a retainer 24, which is maintained in contact with an end face of the spindle 8 and the carrier 21 and presses the proximal tapered roller bearing 9.

This embodiment is provided with a limiting member that limits movements of the bolts 22 in a direction toward the proximal tapered roller bearing 9 due to loosening of the bolts 22 by vibrations applied to the stepped pins 20, carrier 21 and bolts 22.

Figure 5:
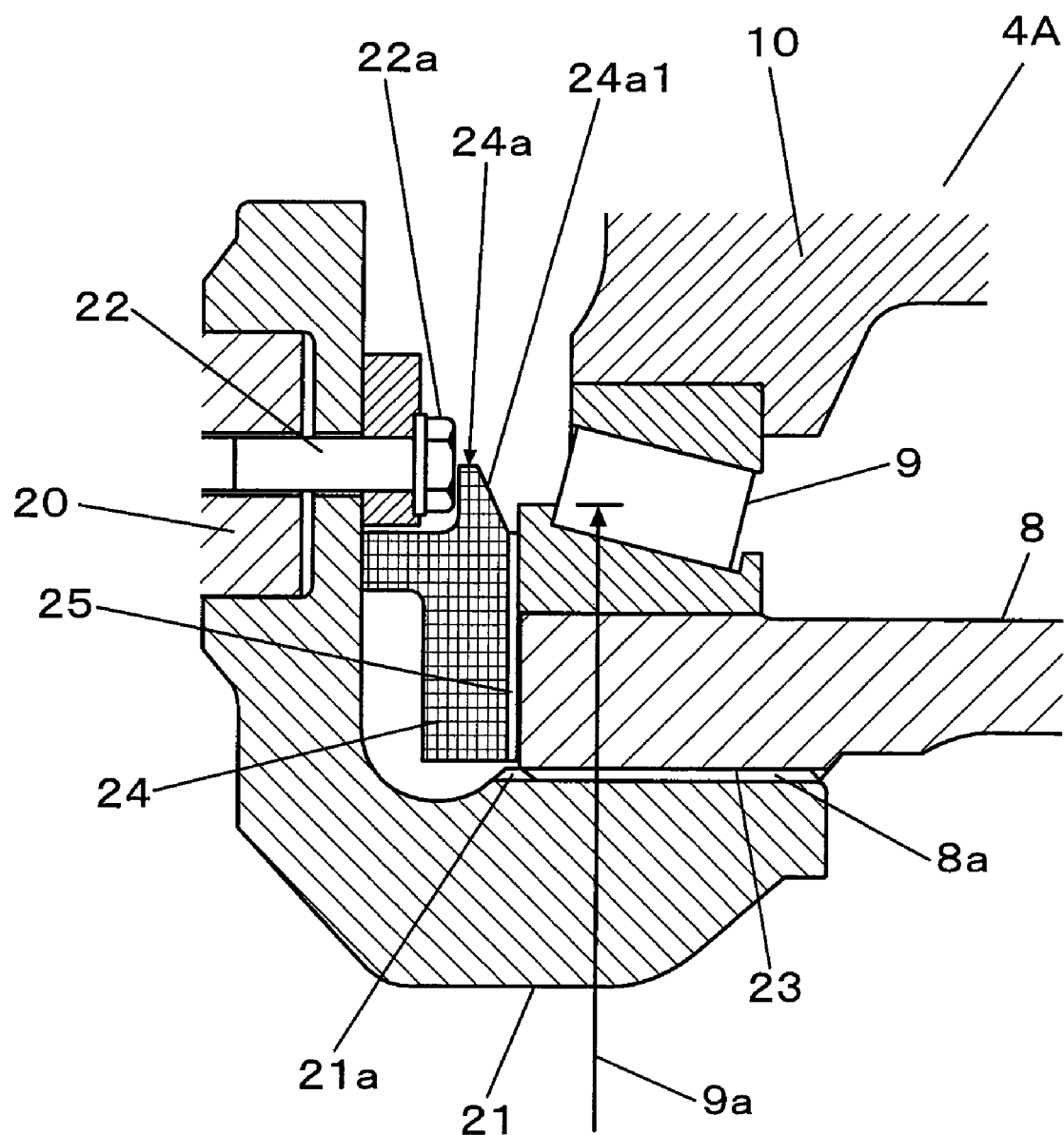
FIG. 5 is an enlarged fragmentary cross-sectional view of FIG. 3.

As depicted by way of example in FIG. 5, this limiting member is comprised of a flange portion 24a, which is arranged on the retainer 24 such that the flange portion 24a is located between the heads 22a of the respective bolts 22 and the proximal tapered roller hearing 9. The flange portion 24a has an inner diameter set smaller than a bore inner diameter 9a of the proximal tapered roller bearing 9.

As shown in FIG. 3, the above-mentioned gear coupling 16 is arranged in the proximity of end faces of the respective stepped pins 20, said end faces being located on a side opposite to the side where the retainer 24 is arranged, and forms another limiting member that limits movements of the respective stepped pins 20 when the stepped pins 20 move in a direction away from the retainer 24 due to loosening of the bolts 22 by vibrations applied to the stepped pins 20, carrier 21 and bolts 22. Circular holes 21b are formed in the gear coupling 16 at locations facing the end faces of the respective stepped pins 20 such that a smaller total area of contact occurs between the gear coupling 16 and the respective stepped pins 20, for example, when the stepped pins 20 move toward the gear coupling 16 and come into contact with the gear coupling 16.

Figure 4:
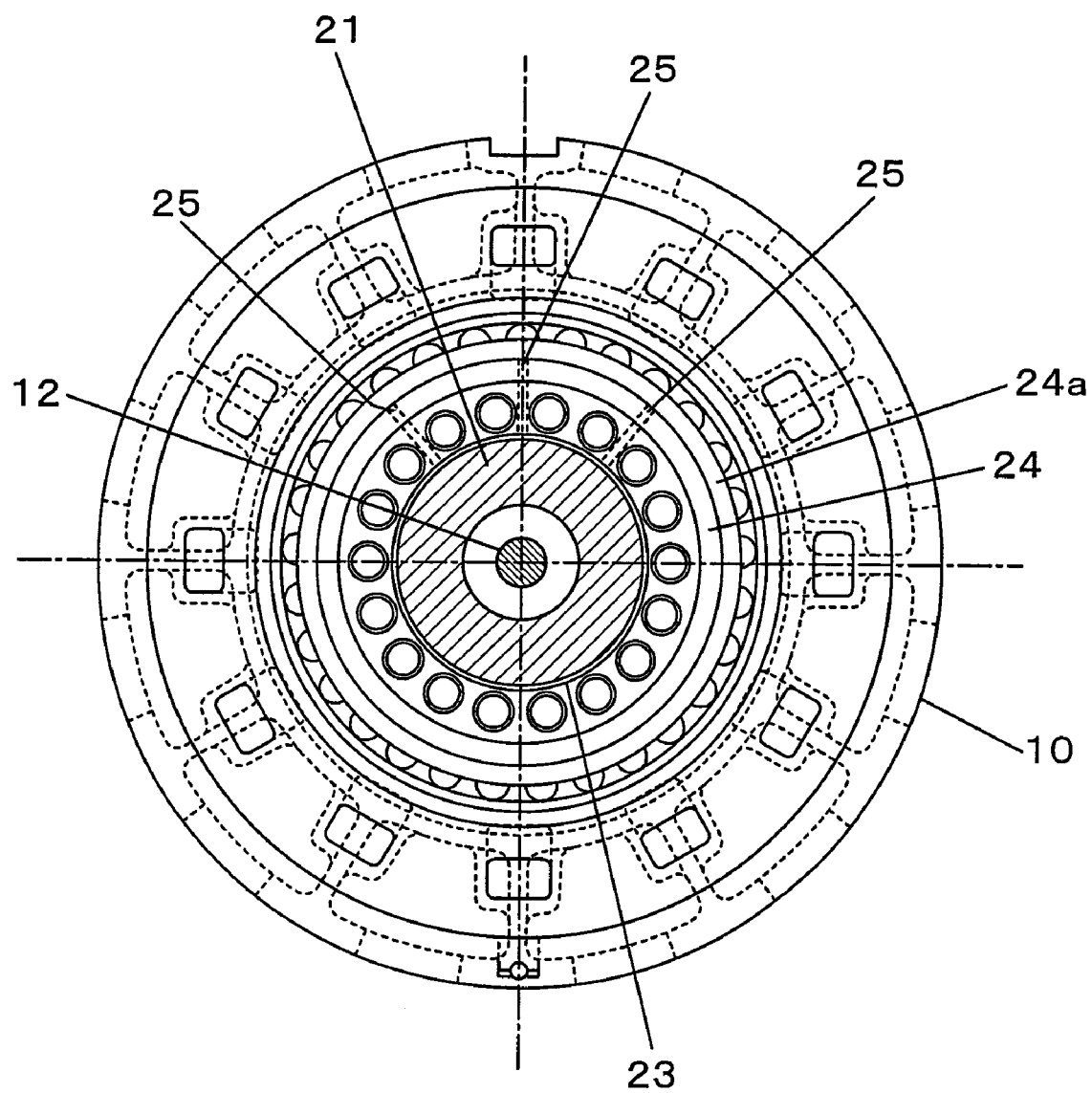
FIG. 4 is a cross-sectional view taken in the direction of arrows IV-IV of FIG. 3.

As depicted in FIGS. 4 and 5, this embodiment is provided with an oil passage that guides the internal lube oil of the planetary speed reduction mechanism 7 to the spline connection 23 that connects the spindle 8 and the carrier 21 with each other. The lube oil is stored inside the planetary speed reduction mechanism 7, for example, to a lube oil level 30 shown in FIG. 3.

The above-mentioned oil passage that guides the lube oil is formed, for example, on the retainer 24. This oil passage comprises a groove 25 formed on the retainer 24.

As shown in FIG. 5, the retainer 24 is also provided with a guide portion for guiding the internal lube oil of the planetary speed reduction mechanism 7 to the oil passage, that is, the groove 25. This guide portion comprises, for example, an inclined surface 24a1 formed on the flange portion 24a.

When the travel motor 6 depicted in FIG. 3 is driven in this embodiment constructed as described above, the shaft 12 is rotated, and by this shaft 12, the first-stage sun gear 13 is rotated. By the rotation of this sun gear 13, the respective planet gears 14 rotate inside the ring gear 19. In association with the rotation of these planet gears 14, the gear coupling 16 rotates and the rotational force of the gear coupling 16 is transmitted to the second-stage sun gear 17. By the resulting rotation of the sun gear 17, the respective planet gears 18 are caused to rotate about their corresponding stepped pins 20 and the wheel 10 is also caused to rotate. The rotation of the wheel 10 is transmitted to the tires 5 via the rims 11, so that the tires 5 are rotationally driven and the mining dump truck with such travel assemblies mounted thereon travels.

Even when the bolts 22 undergo loosening due to vibrations applied to the stepped pins 20, carrier 21 and bolts 22 while such a travel is performed, the bolts 22 are held in place to avoid contact of their heads 22a to the proximal tapered roller bearing 9 because movements of the bolts toward the proximal tapered roller bearing 9 are limited by the flange portion 24a of the retainer 24.

During the above-mentioned travel, the internal lube oil of the planetary speed reduction mechanism 7 shown in FIG. 3 is agitated and splashed upwards to lubricate necessary portions, and in addition, the upwardly-splashed lube oil is guided by the inclined surface 24a1 of the flange portion 24a of the retainer 24 shown in FIG. 5 and is guided into the groove 25 formed on the retainer 24, and is then guided to the splines 21a arranged on the carrier 21 to form the spline connection 23. As a result, the spline connection 23 is lubricated.

According to this embodiment, the wheel 10 can be rotated while transmitting reaction force to rotation of the wheel 10 or the like to the spline connection 23 between the carrier 21 and the spindle 8 via the carrier 21 without needing the arrangement of a hub to be splined to both the spindle 8 and the carrier 21. It is, therefore, possible to make use of the space, which has heretofore been needed for the installation of the hub, as a space for permitting an enlargement of the diametrical dimension of the spindle 8. As a consequence, the diametrical dimension of the spindle 8 can be enlarged to increase its strength to realize a more stable structure. Owing to the elimination of the hub, the number of components can be decreased, thereby making it possible to cut down the manufacturing cost.

By the limiting member, specifically the flange portion 24a arranged on the retainer 24, the respective bolts 22 can be prevented from moving in the direction toward the proximal tapered roller bearing 9. As a consequence, it is possible to hold the bolts 22 in place to avoid contact of their heads 22a to the proximal tapered roller bearing 9. The proximal tapered roller bearing 9 can, therefore, be protected from damages to assure excellent durability.

This embodiment can also reduce an increase in the number of components and can contribute to a lower manufacturing cost, because the limiting member that limits movements of the bolts 22 in the direction toward the proximal tapered roller bearing 9 is constructed by the flange portion 24a arranged on the retainer 24.

When the bolts 22 have undergone loosening, movements of the bolts 22 in the direction toward the proximal tapered roller bearing 9 are limited by the limiting member, specifically the flange portion 24a of the retainer 24. At this time, the limiting force to the bolts 22 as produced by the contact of the heads 22a of the bolts 22 with the flange portion 24a may be transmitted to the stepped pins 20 via the bolts 22 so that the stepped pins 20 may move in the direction away from the retainer 24. In such a case, the movements of the stepped pins 20 are limited by the gear coupling 16, because the gear coupling 16 forms the other limiting member that limits movements of the stepped pins 20 in the direction away from the retainer 24. Therefore, the stepped pins 20 and their corresponding bolts 22 can be maintained in the threaded engagement, thereby assuring the prevention of separation of the bolts 22 from the stepped pins 20. When the stepped pins 20 come into contact with the gear coupling 16, abnormal noise is produced as the gear coupling 16 rotates. The occurrence of such a trouble can, therefore, be readily brought to the attention of the operator of the mining dump truck provided with such travel assemblies.

In this embodiment, the internal lube oil of the planetary speed reduction mechanism 7 can be guided to the spline connection 23 via the oil passage, specifically by groove 25 as mentioned above. Good lubrication can hence be assured for the spline connection 23. As a consequence, it is possible to prevent the wearing of the spline connection 23, which would otherwise take place by reaction force to be applied to the spline connection 23 via the carrier 21 and mutual microvibrations between the spindle 8 and the carrier. Accordingly, excellent durability can be assured.

As the groove 25, that is, the oil passage is formed on the retainer 24, it is also possible to reduce an increase in the number of components and hence to contribute to a lower manufacturing cost.

Because the retainer 24 is provided with the flange portion 24a having the guide portion, specifically the inclined surface 24a1 for guiding lube oil, the internal lube oil of the planetary speed reduction mechanism 7 can be smoothly and surely guided into the groove 25 via the inclined surface 24a1, thereby contributing to the assurance of lubrication to the spline connection 23.

The flange portion 24a, which has the inclined surface 24a1 that constructs the guide portion to guide the internal lube oil of the planetary speed reduction mechanism 7 into the groove 25, is formed as a part of the retainer 24, thereby contributing to a lower manufacturing cost without leading to an increase in the number of components. In addition, the guide portion is simple in construction and can be easily arranged on the retainer 24, because the guide portion is comprised of the inclined surface 24a1 of the flange portion 24a.

Figure 6:
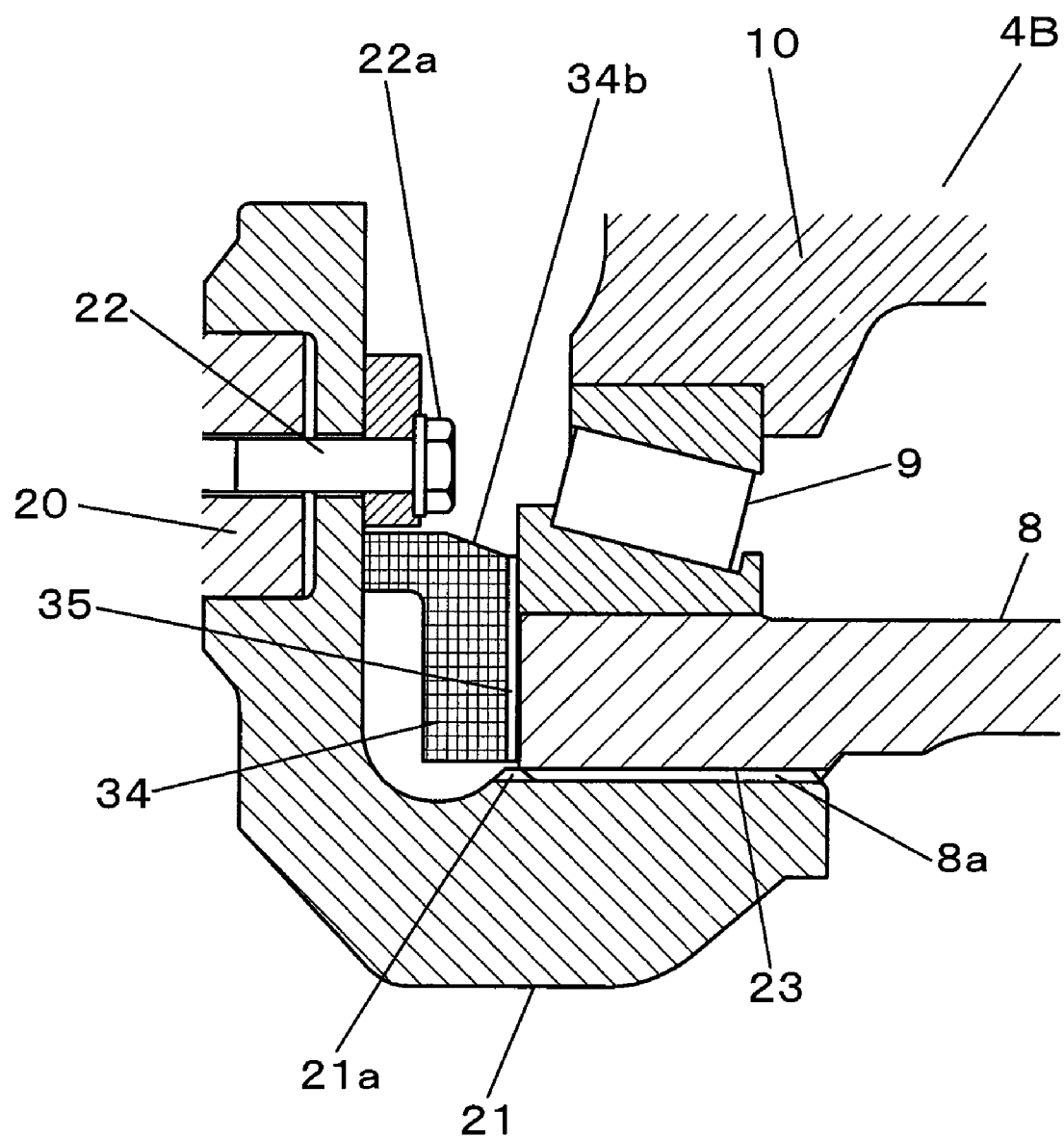
FIG. 6 is an enlarged fragmentary cross-sectional view of a travel assembly according to another embodiment of the present invention.

Referring next to FIG. 6, a travel assembly 4B according to another embodiment of the present invention will be described. In this another embodiment, a retainer 34 is not provided with such a flange portion as the flange portion 24a in the above-described one embodiment, and instead, the guide portion that guides the internal lube oil of the planetary speed reduction mechanism 7 to a groove 35 is comprised of an inclined surface 34b formed on the retainer 34. The remaining construction is similar to the above-described one embodiment shown in FIGS. 3 to 5.

With the another embodiment constructed as described above, the advantageous effects of the flange portion 24a arranged on the retainer 24 in the above-described one embodiment are not available. Nonetheless, the internal lube oil of the planetary speed reduction mechanism 7 can be smoothly and surely guided into the groove 35 via the inclined surface 34b of the retainer 34. Like the above-described one embodiment shown in FIGS. 3 to 5, the inclined surface 34b can hence contribute to the assurance of lubrication to the spline connection 23 between the spindle 8 and the carrier 21.

In each of the above-described embodiments, the oil passage is comprised of the groove 25(35) formed on the retainer 24(34). However, the present invention is not limited to the formation of a groove on a retainer as in the above-described embodiments. For example, a groove that constitutes an oil passage may be formed on the end face of the spindle 8. Instead of such a groove, it may be possible to adopt such a construction that the retainer 24 or 34 or the spindle 8 is provided with a drilled bore to guide the internal lube oil of the planetary speed reduction mechanism 7 to the spline connection 23.

The invention claimed is:

1. A travel assembly provided with a travel motor, a planetary speed reduction mechanism for transmitting rotation of said travel motor at a lower rotational speed, a spindle forming an axle, and a wheel supported on said spindle via a tapered roller bearing and rotatable by said planetary speed reduction mechanism, said planetary speed reduction mechanism comprising a sun gear rotatable by rotation of a shaft of said travel motor, planet gears for rotating said wheel in response to rotation of said sun gear, and a carrier for holding said planet gears, wherein:

said travel assembly is provided with a spline connection connecting said spindle and said carrier with each other and an oil passage for guiding internal lube oil of said planetary speed reduction mechanism to said spline connection, said travel assembly is further provided with a retainer, which is in contact with an end face of said spindle and said carrier and presses said tapered roller bearing, said retainer is provided with said oil passage and a guide portion for guiding the internal lube oil of said planetary speed reduction mechanism to said oil passage, wherein said oil passage comprises a groove and wherein said guide portion is an inclined surface of the retainer for guiding agitated and splashed lube oil into the groove.

2. A travel assembly according to claim 1, wherein said guide portion comprises a flange portion having an inner diameter set smaller than a bore inner diameter of said tapered roller bearing and provided with said inclined surface for guiding the lube oil to said oil passage.

* * * * *